Nov. 3, 1942.  E. R. REHFELD  2,300,594
METHOD AND APPARATUS FOR ATTACHING A SEALING ELEMENT TO A CONTAINER
Filed June 29, 1939  2 Sheets-Sheet 1
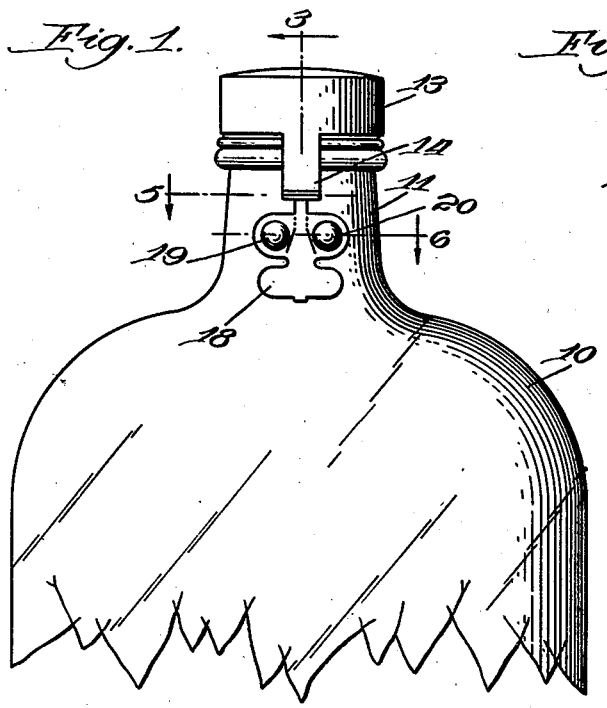
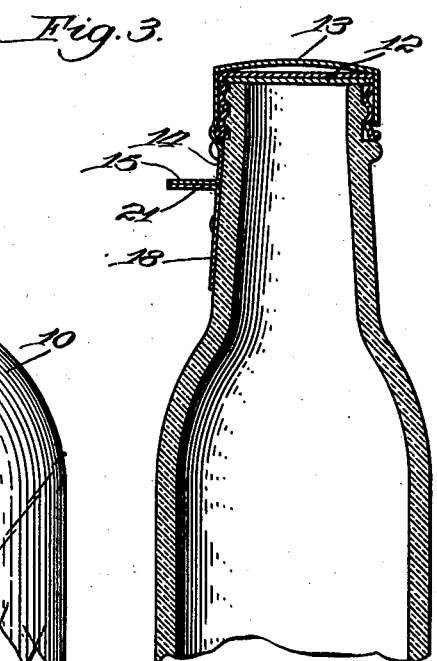
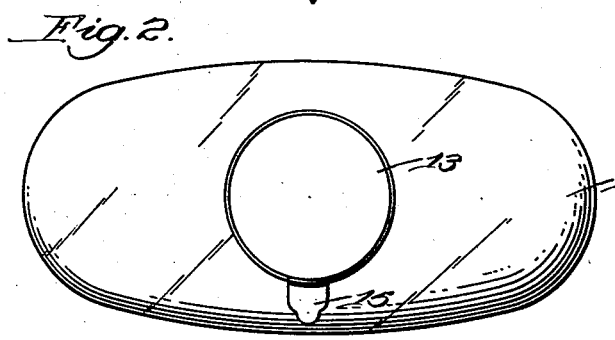
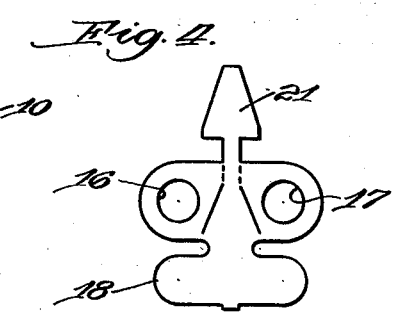
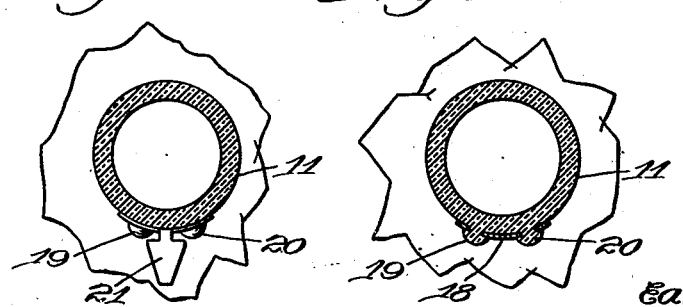
Inventor:
Earl R. Rehfeld.
By Chritton, Wiles, Davies, Hirsch & Dawson
Attys.

Nov. 3, 1942.  E. R. REHFELD  2,300,594
METHOD AND APPARATUS FOR ATTACHING A SEALING ELEMENT TO A CONTAINER
Filed June 29, 1939  2 Sheets-Sheet 2
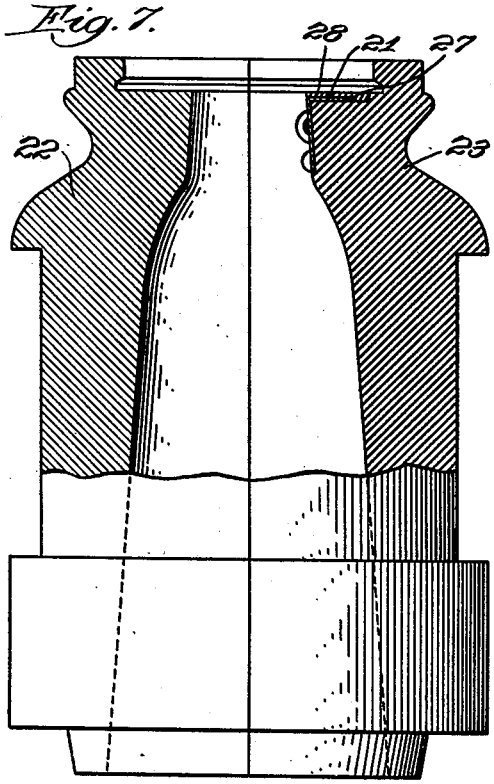
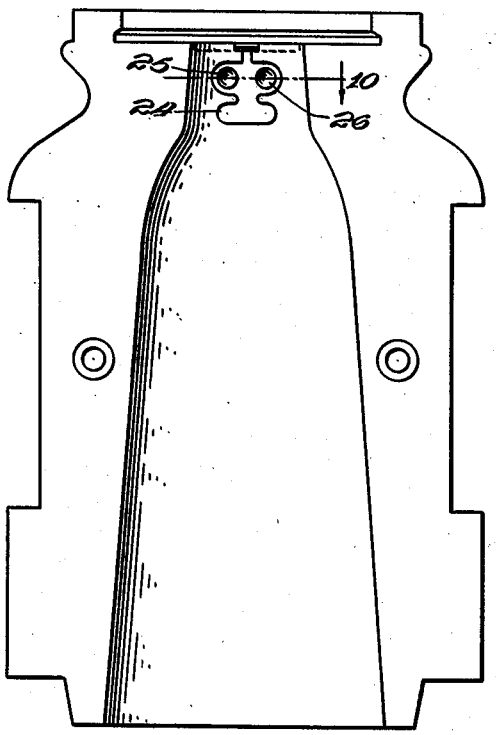
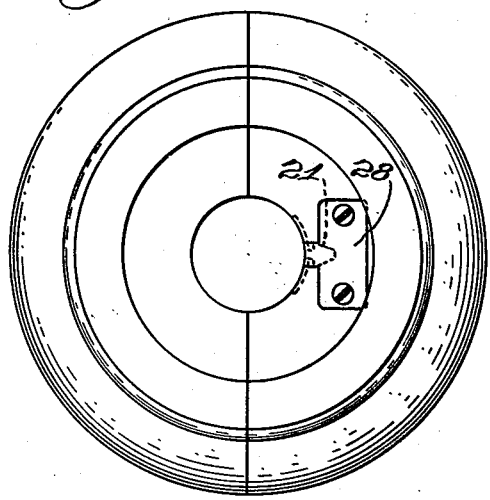
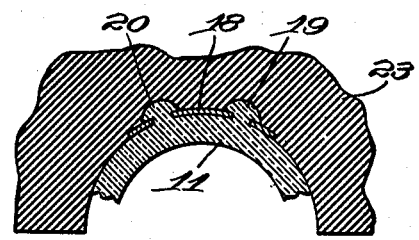
Inventor:
Earl R. Rehfeld.
By Chritton, Wiles, Davis, Hirsch & Dawson
Attys.

Patented Nov. 3, 1942

2,300,594

UNITED STATES PATENT OFFICE 2,300,594

METHOD AND APPARATUS FOR ATTACHING SEALING ELEMENTS TO CONTAINERS

Earl R. Rehfeld, Chicago, Ill.

Application June 29, 1939, Serial No. 281,937

5 Claims. (Cl. 49—66)

This invention relates to a method and apparatus for attaching a sealing element to a container, and more particularly during formation of a container from plastic material.

One feature of this invention is that it provides means for permanently attaching a sealing element, or a part thereof, to a container; another feature of this invention is that the attachment is effected during formation of the container under pressure from plastic material, as during the blowing of a glass bottle; yet another feature of this invention is that the attachment is not reheated or otherwise treated in any way which sets up strains or weakens the container wall or the attachment; still another feature is that this method and apparatus is readily adapted to be used in conventional high speed automatic apparatus for forming containers from plastic material, as bottle blowing machines; other features and advantages will be apparent from the following specification and the drawings, in which:

Figure 1 is a partial side elevation of a bottle showing my sealing means in place thereon; Figure 2 is a top plan view of the same bottle; Figure 3 is a sectional view along the line 3 of Figure 1; Figure 4 is a detailed view of the sealing element designed to be permanently attached to the neck of the bottle; Figure 5 is a transverse sectional view through the neck of the bottle, along the line 5 of Figure 1; Figure 6 is a lower transverse sectional view through the neck of the bottle, along the line 6 of Figure 1; Figure 7 is a view, partly in section, of a mold having a sealing element in place thereon for attachment to a bottle during the blowing thereof; Figure 8 is an elevation of a mold segment showing the recess and openings provided in the wall thereof; Figure 9 is a top plan view of the mold shown in Figure 7; and Figure 10 is a fragmentary sectional view along the line 10 of Figure 8, by showing the seal and bottle in the mold.

In many cases it is desirable to provide sealing means for a container so arranged that the seal must be destroyed, ruptured, or defaced in some manner in order to permit removal of the contents of the container; and so designed that after it has once been ruptured or otherwise defaced it cannot be replaced, so that the customer can readily tell whether a bottle or other container having such a sealing means thereon has been refilled by an unauthorized person.

I have heretofore invented sealing means which fulfills these requirements, and I am here claiming method and apparatus for permanently attaching an element of such a sealing means to a container, as to the neck of a bottle, during its formation under pressure from plastic material. The sealing means as a whole, the specific configuration and construction of the sealing element designed to be attached to the container, and apparatus for rapidly and automatically placing sealing elements in molds of the type shown here, are the subject matters of other co-pending applications in which I am an inventor. These applications are: Serial No. 108,326, filed October 30, 1936; Serial No. 108,327, filed October 30, 1936; Serial No. 149,337, filed June 21, 1937; Serial No. 281,937, filed June 29, 1939; Serial No. 282,932, filed July 5, 1939; and Design Serial No. 89,901, filed January 31, 1940.

In the particular embodiment of my invention disclosed herewith a bottle 10 has a neck 11 provided at the top with conventional external threads. A bottle cap 12, as may be best seen in Figure 3, is adapted to be screwed in place over the orifice in the neck to maintain the contents of the bottle, generally liquid, therein. Over this is placed a closure 13 having a depending strap-like portion 14 with an outwardly turned end 15.

Another element of the sealing means, shown separately in Figure 4, is adapted to be permanently attached to the neck of the bottle by rivet-like portions of the neck protruding through openings 16 and 17 in the body portion of the sealing element 18. That is, as may be clearly seen in Figure 6, a rivet-like projection of the glass of the neck of the bottle 11, here identified as 19, projects through the opening 16 of the sealing element 18; and another rivet-like portion projects through the opening 17. These portions 19 and 20 permanently attach the sealing element 18 to the neck of the bottle in such a way that it cannot be removed except by rupturing it; and so that another sealing element cannot be replaced thereafter.

The sealing element 18 has at the upper end thereof a tip portion 21 adapted to be bent out at right angles to the body portion and to lie immediately under the extending end 15 of the depending portion of the closure, as may be best seen in Figure 3. The sealing element is designed to be attached to the neck of the bottle during its formation; and the closure to be placed in the position shown after filling and capping of the bottle, whereupon the seal is effected by spot-welding or otherwise permanently joining the parts 15 and 21.

In order to achieve the desired attachment of the sealing element to the neck of the bottle I provide a bottle-forming mold with an opening in one wall thereof of greater diameter than the openings 16 and 17 through the sealing element, and adapted to register therewith; and means for maintaining a sealing element in place adjacent the wall of the mold with the respective cooperating openings concentric with each other, or in registry, during formation of the bottle. Blowing of the glass in the mold thus forces a portion of the plastic glass through the openings 16 and 17 in the sealing element and causes expansion thereof in the larger registering openings in the mold, so that the desired rivet-like portions are formed.

Referring more particularly to Figures 7 to 10, a mold of the general type commonly used in automatic bottle-blowing machinery is shown. This mold comprises two principal parts or separable halves 22 and 23. The steps of forming or blowing a bottle with such a mold are well known in the art, and will not be gone into in detail here. It is believed sufficient to say that a plurality of such molds are placed around a rotatable table. At certain stages in the rotation of the table a slug of molten glass is inserted in the mold, the top plate and blower head applied, and the bottle blown. The mold segments then separate and the bottle is transferred to a finishing mold on another table; and thereafter the segments reclose and return to the stage where they receive a new slug of glass.

I provide in the neck portion of the mold, herein the segment 23, a relatively shallow recess 24 having a depth equal to the thickness of the sheet metal of which the sealing element is formed and an outer configuration conforming to that of the sealing element, so that the recess is adapted to receive the body portion of the sealing element. In the bottom of the recess I provide a pair of openings 25 and 26 in the wall of the mold. These openings are substantially in the form of a segment of a sphere, the diameter of the rims thereof being greater than the diameter of the openings 16 and 17 in the sealing element. These openings are so placed that when the body portion of the sealing element is in the recess 24 the various openings register; that is, the opening 16 is concentric with the opening 25 and the openings 17 and 26 are similarly concentric.

Since I show the various openings as circular in the particular embodiment of my invention illustrated herewith, I have used terms such as "diameter" and "concentric" which are generally associated only with circles. It will be understood, however, that these various openings may be of any desired shape, as for example hexagonal or square; and that I intend the various terms which I use to describe position, size, and the like to be construed in connection with other shapes than circles.

At the top of the recess, speaking with respect to the position of the mold as shown in Figures 7 and 8, I provide a long slot-like opening 27 adapted to receive the turned-down tip portion 21 of the sealing element. This opening, because of its shape, is preferably provided between a shoulder on the top of the mold segment 23 and a separable plate 28. Once the plate is in position, however, it is for all functional purposes a part of the mold segment 23; and the space between the plate and the shoulder may, therefore, be considered as an opening in the wall of the mold. This is desired to be a tight fit for the tip portion of the sealing element, so that no glass will work in around it during blowing of the bottle. Moreover, the fact that the tip portion is turned at right angles to the remainder of the sealing element, and is fitted rather tightly in the opening 27, serves to keep the sealing element from falling out of the recess during formation of the bottle. It is to be understood, of course, that after each mold has discharged its bottle, and before the halves are reclosed, a sealing element such as 18 is inserted. This may, of course, be done in any desired manner; but is preferably done by automatic apparatus which I disclose in a co-pending application mentioned above, Serial No. 282,932.

While I have described certain embodiments of my invention, it is to be understood that it is capable of many modifications. Changes, therefore, in the construction and arrangement may be made without departing from the spirit and scope of the invention as disclosed in the appended claims.

I claim:

1. Apparatus for effecting joinder of a sealing element, of sheet metal having an opening therethrough, to a container during formation thereof under pressure from a plastic material, including: a mold having a recess in a substantially vertical wall portion thereof of a depth substantially equal to the thickness of the sheet metal and a shape conforming to that of the sealing element, the wall having an opening in the bottom of the recess of greater diameter than that of the opening through the sealing element; and means for maintaining the sealing element, during the formation of the container, in a position adjacent said wall and with the openings substantially concentric, whereby the plastic material flows through the opening in the sealing element and expands therebehind in the opening in the wall of the mold.

2. Apparatus for effecting joinder of a sealing element of relatively small size, of sheet metal having a principal body portion with an opening therethrough and a tip portion at an angle thereto, to a container during formation thereof under pressure from a plastic material, including: a mold having a recess in one wall thereof of a depth substantially equal to the thickness of the sheet metal and a shape conforming to that of the sealing element, the wall having an opening in the bottom of the recess of greater diameter than that of the opening through the sealing element and substantially concentric therewith, and a second opening adapted to tightly receive the tip portion, whereby the sealing element is maintained with the body portion thereof in the recess during formation of the container.

3. The method of maintaining a sealing element of sheet metal in a desired position on a substantially vertical neck portion of a mold during formation of a necked bottle from plastic glass under pressure therein, comprising bending a small portion of the element at a right angle to the remainder thereof and inserting it in an opening in the neck portion of the mold adapted to tightly receive it.

4. Apparatus for effecting joinder of a sealing element, of sheet metal having an opening therethrough, to the neck of a bottle during formation thereof under pressure from plastic glass, including: a mold having a main body portion and a reduced vertical neck portion, the neck portion having a recess in the wall thereof of a depth substantially equal to the thickness of the sheet metal and a shape conforming to that of the sealing element, the wall having an opening in the bottom of the recess of greater diameter than that of the opening through the sealing element; and means for maintaining the sealing element, during the formation of the bottle, in a position adjacent said wall and with the openings substantially concentric, whereby the glass flows through the opening in the sealing element and expands therebehind in the opening in the wall of the mold.

5. Apparatus for effecting joinder of a sealing element of relatively small size, of sheet metal having a principal body portion with an opening therethrough and a tip portion at an angle thereto, to the neck of a bottle during formation thereof under pressure from plastic glass, including: a mold having a main body portion and a reduced vertical neck portion, the neck portion having a recess in the wall thereof of a depth substantially equal to the thickness of the sheet metal and a shape conforming to that of the sealing element, the wall having an opening in the bottom of the recess of greater diameter than that of the opening through the sealing element and substantially concentric therewith, and a second opening adapted to tightly receive the tip portion, whereby the sealing element is maintained with the body portion thereof in the recess during formation of the container.

EARL R. REHFELD.